UNITED STATES PATENT OFFICE.

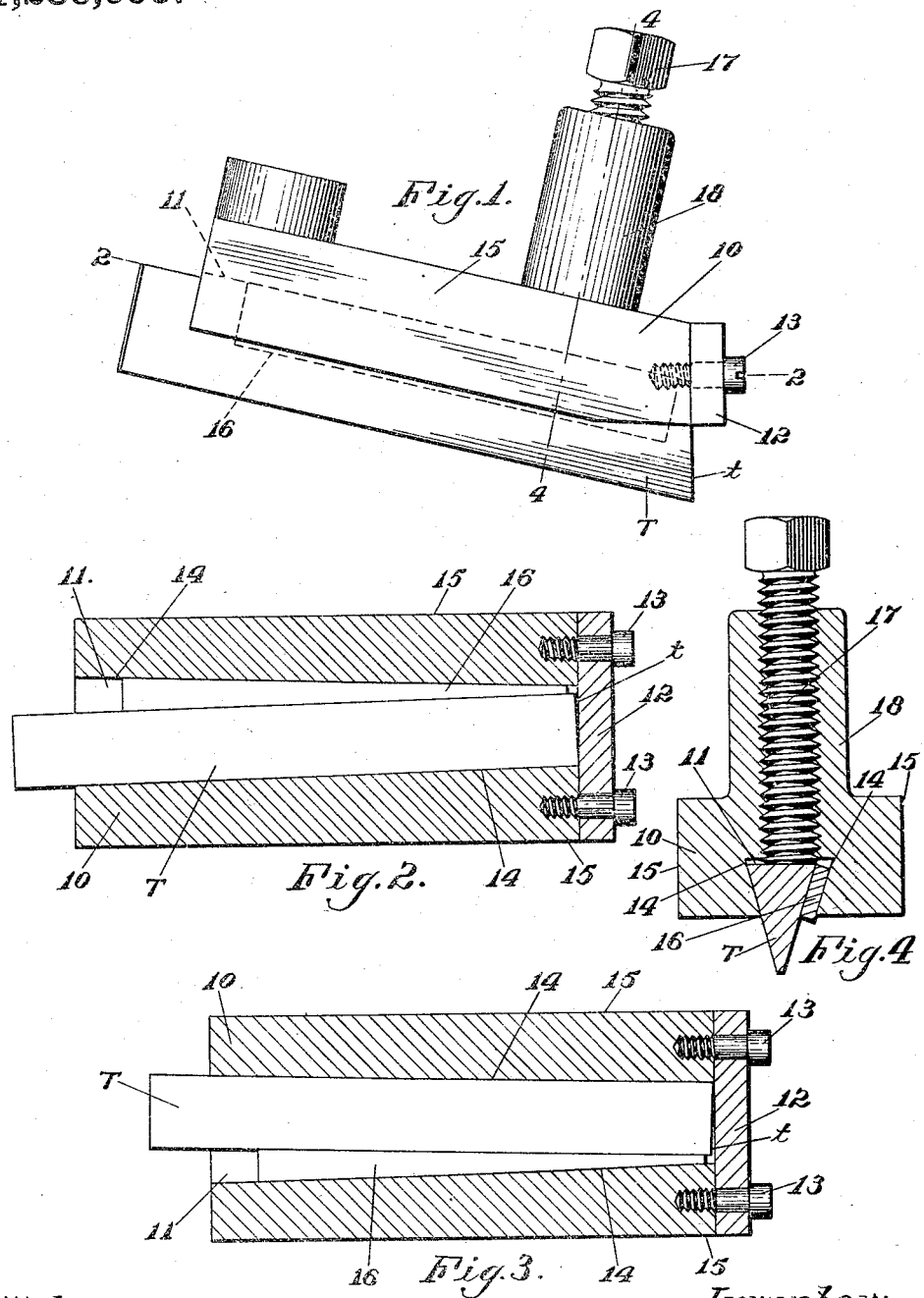

CHARLES E. DERR, OF DETROIT, MICHIGAN, ASSIGNOR TO PACKARD MOTOR CAR COMPANY, OF DETROIT, MICHIGAN, A CORPORATION OF MICHIGAN.

TOOL DEVICE.

1,286,955.      Specification of Letters Patent.      Patented Dec. 10, 1918.

Application filed September 7, 1915. Serial No. 49,227.

*To all whom it may concern:*

Be it known that I, CHARLES E. DERR, a citizen of the United States, and resident of Detroit, Wayne county, State of Michigan, have invented certain new and useful Improvements in Tool Devices, of which the following is a specification.

This invention relates to gear cutting machines and particularly to tool holders for such machines.

One of the objects of the present invention is to provide a tool holder having opposed tool guiding faces for holding a tool in different positions to afford the proper clearance for the tool in making different cuts.

This and other objects of the invention will appear from the following description taken in connection with the drawings which form a part hereof, and in which:—

Figure 1 is a side elevation of a tool holder embodying the invention;

Fig. 2 is a longitudinal section substantially on the line 2—2 of Fig. 1;

Fig. 3 is a view similar to Fig. 2, with the tool shown in a different position; and Fig. 4 is a section on the line 4—4 of Fig. 1.

Referring to the drawings, 10 represents a tool holder of substantially rectangular form. In its underneath face the holder is formed with a longitudinally extending tool receiving groove 11 preferably of dove-tail cross section as shown in Fig. 4. The forward end of this groove is closed by a detachable abutment 12 secured to the holder by the screws 13, and the groove tapers toward this forward end so that each of its sides or guide walls 14 is at a slight angle throughout its length to the long sides 15 of the holder. Thus when a tool T is placed against one of the guide walls 14 its front or cutting face *t* will set at a slightly different angle than it would if the side 14 were parallel to the side 15, and the part of the tool immediately back of the face *t* will give better clearance than otherwise. Also, when the holder is used on a gear cutting machine in which one side only of a gear tooth is finished at a time, the opposing sides 14 of the groove may be so positioned relative to each other that the same or a corresponding tool will be correctly positioned for the second cut by simply shifting from one side of the groove to the other after the cut on one side of the tooth has been completed.

Means for securing the tool in position in the groove are provided in the form of a wedge shaped block 16 which suitably fills the space between one side of the tool and the adjacent side of the groove, and a bolt 17 which is threaded into a boss 18 and through the holder into the groove where its end strikes the tool and clamps it down together with the block 16 securely against the walls 14 of the groove 11. Thus it will be seen that the tool may be adjusted by positioning it against either of the opposing tool guiding walls 14 of the groove with its cutting face against the abutment 12, inserting the wedge block 16 and pressing it forwardly as far as it will go, and then screwing the bolt 17 down against the tool.

While but one form of the invention is herein shown and described, it will be understood that the invention is not limited to the details of construction shown, and it will be apparent that changes may be made without departing from the spirit or scope of the invention as set forth in the following claims.

Having thus described my invention, what I claim and desire to secure by Letters Patent is:

1. A tool holder having a tapered groove in its underneath face, an abutment for the tool at one end of said groove, and means for securing the tool with one end against said abutment and with a side against one of the sides of said groove.

2. A tool holder having a tapered tool receiving groove and an abutment for the tool at one end of the holder.

3. The combination with a tool holder having a detachable positioning plate at one end thereof, of a tool for said holder, means for positioning said tool against said plate and means coöperating with said first named means for fixing said tool in such position.

4. The combination with a tool holder having a longitudinal groove in the underneath face and a detachable positioning plate at the forward end of the groove, of a tool for said holder mounted in said groove, means for positioning said tool against said plate and means coöperating with said first named means for fixing said tool in such position.

5. The combination with a tool holder having a longitudinal groove in its underneath face said groove being of a dove tailed cross section, of a tool for said holder and means for securing said tool in place.

6. The combination with a tool holder having a longitudinal groove in its underneath face said groove being of a dove tailed cross section, and being tapered toward the forward end, of a tool for said holder and means for securing said tool in place.

7. The combination with a tool holder having a longitudinal groove in its underneath face said groove being of a dove tailed cross section and being tapered toward the forward end and a detachable abutment across said forward end, of a tool for said holder and means for fixing said tool in position against said abutment.

8. The combination with a tool holder having a longitudinal groove in its underneath face, said groove being of dove tailed cross section and being tapered toward the forward end, of a tool for the holder, wedge shaped means for positioning said tool longitudinally of the groove and independent means for positioning said tool transversely of said groove.

9. The combination with a tool holder having a longitudinal groove in its underneath face, said groove being of dove tailed cross section and being tapered toward the forward end, of a tool for the holder, wedge shaped means arranged between the tool and one of the tapered sides of said groove for positioning said tool longitudinally of the groove and independent means for positioning said tool transversely of said groove.

10. The combination with a tool holder having a longitudinal groove in the underneath face said groove being of dove tailed cross section and being tapered toward the forward end, and a detachable positioning plate at the forward end thereof, of a tool for said holder mounted in said groove, a wedge between the tool and the side of the slot for positioning the tool longitudinally against the detachable plate and a bolt movable downwardly through the holder and contacting with the tool to fix the same in position.

In testimony whereof I affix my signature.

CHARLES E. DERR.

Copies of this patent may be obtained for five cents each, by addressing the "Commissioner of Patents, Washington, D. C."